(12) United States Patent
Handach

(10) Patent No.: US 7,080,942 B2
(45) Date of Patent: Jul. 25, 2006

(54) BIMETAL THERMOMETER

(75) Inventor: Sasha Handach, Lawrenceville, GA (US)

(73) Assignee: WIKA Alexander Wiegand GmbH & Co. KG, Main (DE)

( * ) Notice: Subject to any disclaimer, the term of this patent is extended or adjusted under 35 U.S.C. 154(b) by 44 days.

(21) Appl. No.: 10/894,236

(22) Filed: Jul. 19, 2004

(65) Prior Publication Data
US 2006/0013283 A1  Jan. 19, 2006

(51) Int. Cl.
G01K 5/42 (2006.01)
G01K 1/22 (2006.01)

(52) U.S. Cl. ............... 374/207; 374/205; 374/208; 374/195; 116/216

(58) Field of Classification Search ........ 374/208, 374/205, 195, 206, 207; 116/216
See application file for complete search history.

(56) References Cited

U.S. PATENT DOCUMENTS

| | | | | |
|---|---|---|---|---|
| 2,117,287 A | * | 5/1938 | Bloch ................... | 374/187 |
| 2,343,372 A | * | 3/1944 | Ford et al. ............ | 374/207 |
| 2,365,487 A | * | 12/1944 | Murray ................. | 374/207 |
| 2,457,286 A | * | 12/1948 | Tollefsen et al. ...... | 116/293 |
| 2,502,159 A | * | 3/1950 | Lamb et al. .......... | 200/56 R |
| 2,541,790 A | * | 2/1951 | Sugden et al. ........ | 74/99 R |
| 2,558,743 A | * | 7/1951 | Ford .................... | 374/207 |
| 2,572,059 A | * | 10/1951 | Schlaich .............. | 374/204 |
| 2,597,939 A | * | 5/1952 | Lamb .................. | 116/291 |
| 2,601,784 A | * | 7/1952 | Rose ................... | 374/195 |
| 2,706,962 A | * | 4/1955 | Kebbon ................ | 116/221 |
| 2,833,149 A | * | 5/1958 | Aldridge et al. ....... | 374/205 |
| 2,918,819 A | * | 12/1959 | Freeman ................ | 374/200 |
| 2,988,041 A | * | 6/1961 | Schmitz, Jr. et al. ...... | 116/292 |
| 3,066,534 A | * | 12/1962 | Pierson ................ | 374/208 |
| 3,122,018 A | * | 2/1964 | Freeman et al. ........ | 374/1 |
| 3,279,257 A | * | 10/1966 | Hunt .................... | 374/198 |
| 3,491,598 A | * | 1/1970 | Wetterhorn ............ | 374/207 |
| 3,835,708 A | * | 9/1974 | Gruett .................. | 73/292 |
| 3,851,529 A | * | 12/1974 | Andrews et al. ........ | 374/206 |
| 3,952,596 A | * | 4/1976 | Patel ................... | 374/198 |
| 4,311,049 A | * | 1/1982 | La Passo et al. ....... | 374/207 |
| 4,595,301 A | * | 6/1986 | Taylor .................. | 374/207 |
| 4,950,085 A | * | 8/1990 | Horvath ................ | 374/207 |
| 5,567,053 A | * | 10/1996 | Ashe .................... | 374/155 |
| 2003/0112846 A1 | * | 6/2003 | Murtagh ................ | 374/149 |
| 2005/0003970 A1 | * | 1/2005 | Ohmura et al. ......... | 508/365 |

* cited by examiner

Primary Examiner—Gail Verbitsky
(74) Attorney, Agent, or Firm—Roth & Goldman, P.A.

(57) ABSTRACT

The bimetal thermometer according to the invention comprises a bimetal helix arranged inside a protective tube, one end thereof being attached to the protective tube and the other end thereof being connected to a pointer shaft to which a pointer arranged inside a casing is attached. The pointer shaft is rotatably journaled in a bearing assembly in which a cavity is formed through which the pointer shaft extends. The cavity is filled with semisolid lubricating grease for damping vibration movements of the pointer shaft. The pointer shaft has either a smooth surface or is provided with at least one radial projection arranged inside the cavity. Vibration movements of the pointer shaft are damped by the interaction of the pointer shaft and, if provided, the projections with the viscous lubricating grease. This design of the bearing assembly and the pointer shaft permits to provide a damped bimetal thermometer without a liquid filling being required in the casing and the protective tube or at least in the protective tube for the purpose of damping.

18 Claims, 1 Drawing Sheet

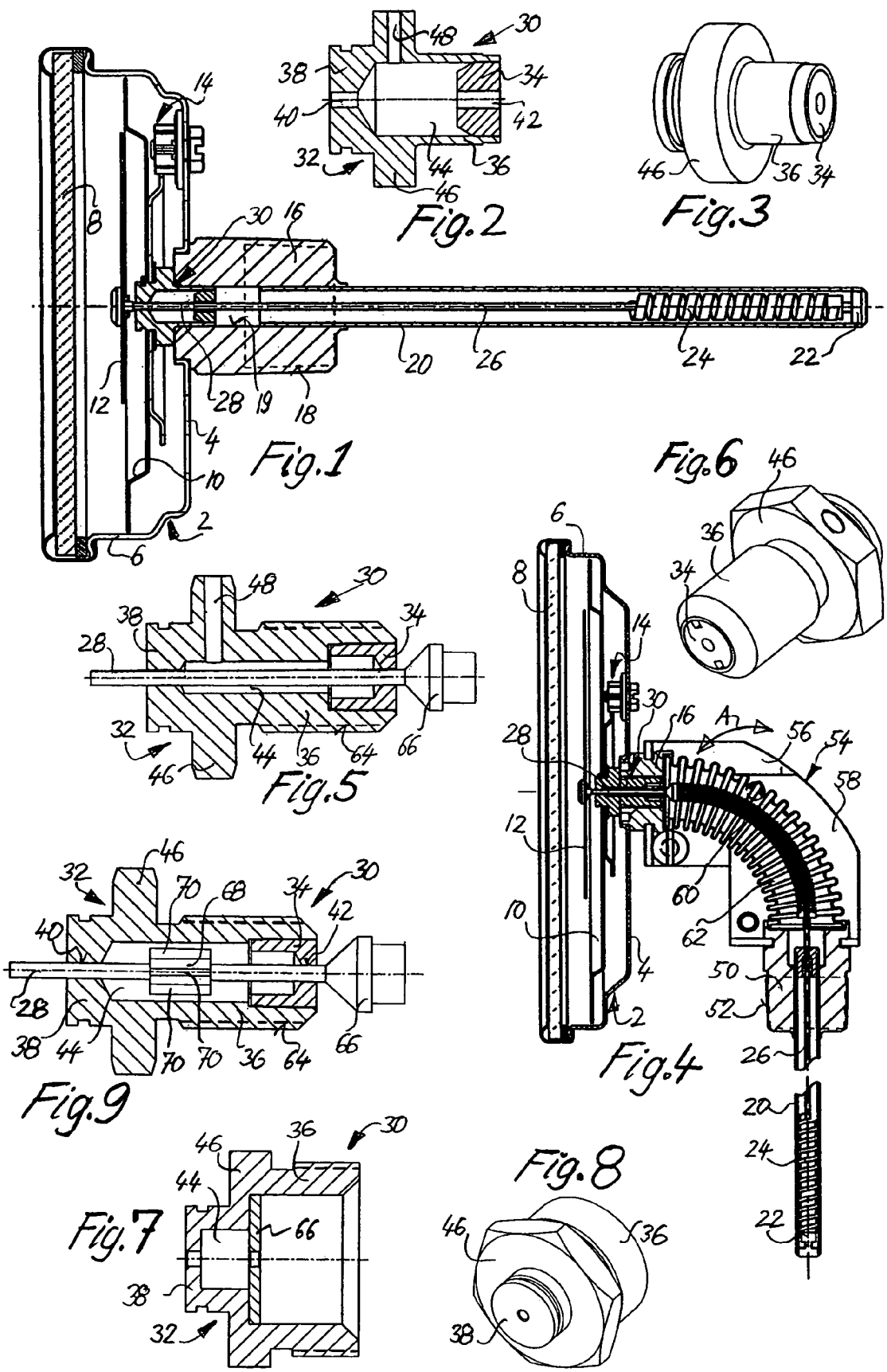

BIMETAL THERMOMETER

BACKGROUND OF THE INVENTION

1. Field of the Invention

The invention relates to a bimetal thermometer. The invention especially relates to a bimetal thermometer comprising a cup-shaped casing which has a bottom wall and supports a window at its edge opposed to the bottom wall, a casing carrier to which the bottom wall is attached, a protective tube having a free closed end and being connected to the casing carrier at its other end, and a bimetal helix arranged inside the protective tube and being attached with its first end to the free end of the protective tube. A dial and a pointer which is fixed to a pointer shaft are arranged inside the casing. The pointer shaft is rotatably journaled by means of a bearing assembly, extends through the casing carrier and is connected to the second end of the bimetal helix such that a temperature-dependent rotation of the second end of the bimetal helix causes a rotation of the pointer shaft.

2. Related Background Art

A bimetal thermometer comprising the aforementioned features is known. In order to measure the temperature of a measuring substance at a measuring point by means of the bimetal thermometer the latter is mounted at the measuring point such that the protective tube is surrounded by the measuring substance so that the protective tube and the bimetal helix arranged inside the protective tube take the temperature of the measuring substance. In the case of a change in temperature the second end of the bimetal helix performs a rotation about the axis of the bimetal helix. This rotation is transmitted to the pointer via the pointer shaft so that the pointer takes a position in front of the scale of the dial corresponding to the prevailing temperature and thereby the value of the temperature is indicated on the scale.

When during operation vibrations which cause a vibration movement of the pointer are transmitted to the bimetal thermometer, this impedes reading of the temperature value from the scale. Furthermore vibration movements of the movable members of the bimetal thermometer increase the wear thereof. In order to prevent these drawbacks it is known to fill the bimetal thermometer with a damping liquid so as to damp the vibration movements by liquid friction. The damping liquid which may be, for instance, silicone oil is provided either both in the casing and in the protective tube or only in the protective tube. As the temperature stability of the damping liquid is limited, the indicating and measuring range of bimetal thermometers damped by a damping liquid has an upper limit. Such bimetal thermometers cannot be used for temperatures of more than 160° C., for instance. It is furthermore a drawback that the measuring substance is rendered impure by the damping liquid, if the bimetal thermometer gets leaky and the damping liquid escapes.

SUMMARY OF THE INVENTION

An object underlying the invention is to provide a damped bimetal thermometer which does not have the aforementioned drawbacks.

It is a further object underlying the invention to provide a damped bimetal thermometer which is adapted to measure temperatures higher than the maximum limit temperature of a conventional bimetal thermometer in which the damping is effected by means of a damping liquid.

Moreover it is an object underlying the invention to provide a damped bimetal thermometer in which the risk of impurities by escaping damping liquid is prevented.

In accordance with a first aspect of the invention, these objects are achieved by a bimetal thermometer comprising a cup-shaped casing which has a bottom wall and supports a window at its edge opposed to the bottom wall, a casing carrier to which the bottom wall is attached, a protective tube having a free closed end and being connected at its other end to the casing carrier, and a bimetal helix arranged inside the protective tube and being attached with its first end to the free end of the protective tube. The pointer shaft is rotatably journaled by means of a bearing assembly and extends through the casing carrier. Furthermore the pointer shaft is connected to the second end of the bimetal helix such that a temperature-dependent rotation of the second end of the bimetal helix causes a rotation of the pointer shaft. The bearing assembly includes a cavity filled with lubricating grease. The pointer shaft extends through this cavity of the bearing assembly filled with lubricating grease.

In the bimetal thermometer according to the first aspect of the invention vibration movements of the pointer shaft and the pointer are damped by the viscous lubricating grease adhering to the pointer shaft. It has been found that the damping effect achieved in this way is substantially equal to the one which can be achieved in a conventional bimetal thermometer by silicone oil filling. The bimetal thermometer according to the invention thus requires no liquid filling to achieve the desired damping, and correspondingly in the bimetal thermometer according to the invention it is provided that neither the protective tube nor the casing is filled with a damping liquid. The bearing assembly in which the pointer shaft is supported is arranged to be spatially separated from the bimetal helix and consequently is not exposed to the temperature of the measuring substance. Therefore the bimetal thermometer according to the invention is also suited for measuring temperatures which are higher than the maximum temperatures admissible in liquid-filled bimetal thermometers. Since in the bimetal thermometer according to the invention no damping liquid is provided in the protective tube, the measuring substance cannot be rendered impure by damping liquid escaping from the protective tube, if the protective tube might leak.

The lubricating grease may substantially consist of a mixture of mineral oil and a thickener. Especially preferred is lubricating grease which substantially consists of a mixture of synthetic hydrocarbon and amorphous silicon dioxide.

Preferably the lubricating grease is plastically solid in the entire indicating range of the bimetal thermometer. The dropping point of the lubricating grease is preferably above 260° C.

In accordance with a second aspect of the invention, the aforementioned objects are achieved by a bimetal thermometer comprising a cup-shaped casing which has a bottom wall and supports a window at its edge opposed to the bottom wall, a casing carrier having a free closed end and being connected to the casing carrier at its other end, and a bimetal helix arranged inside the protective tube and being attached with its first end to the free end of the protective tube. A dial and a pointer which is fastened to a pointer shaft are arranged inside the casing. The pointer shaft is rotatably journaled by means of a bearing assembly and extends through the casing carrier. Furthermore the pointer shaft is connected to the second end of the bimetal helix such that a temperature-dependent rotation of the second end of the bimetal helix causes a rotation of the pointer shaft. The bearing assembly includes a cavity filled with lubricating grease. The pointer shaft extends through this cavity and in the region of the cavity at least one radial projection is arranged at the pointer shaft.

In the bimetal thermometer according to the second aspect of the invention vibration movements of the pointer shaft and the pointer are damped by the viscous lubricating grease adhering to the pointer shaft. In addition the vibration movements are damped by the at least one projection which, when performing a rotation movement in the cavity, must displace some of the lubricating grease in the cavity so that the lubricating grease causes a resistance to the movement of the protrusion. It has turned out that by this damping produced in the bearing assembly substantially the same damping effect can be achieved as it can be produced in a conventional bimetal thermometer by means of liquid filling. This permits to achieve the desired damping effect without a liquid filling being provided in the protective tube and in the casing. Consequently, also in the bimetal thermometer according to the second aspect of the invention it is provided that neither the casing nor the protective tube is filled with a damping liquid.

The bearing assembly filled with the lubricating grease is arranged to be spatially separated from the bimetal helix. When the bimetal helix and the protective tube surrounding the same are exposed to a high temperature, at the bearing assembly there is not prevailing the same high temperature but a lower temperature. Therefore, even if the maximum admissible temperature of the lubricating grease is not higher than that of the liquid filling that is filled into the protective tube of a conventional damped bimetal thermometer, the bimetal thermometer according to the invention still can be used up to higher temperatures than the conventional liquid-filled bimetal thermometer.

Finally, also in the bimetal thermometer according to the second aspect of the invention there is no risk that the measuring substance is rendered impure by liquid escaping from the protective tube, because liquid is not provided in the protective tube.

It is provided in an advantageous configuration of the invention according to the second aspect that in the region of the cavity a sleeve which is integrally formed with at least one radially projecting wing that constitutes the radial projection is attached to the pointer shaft. Preferably the sleeve has two or four wings arranged equidistant in the circumferential direction of the sleeve.

Both in the bimetal thermometer according to the first aspect of the invention and in the bimetal thermometer according to the second aspect of the invention the bearing assembly preferably includes a bushing and a closure element, wherein the bushing has a cylindrical wall and a front wall at the one end thereof in which a first bearing hole for the pointer shaft is provided, and wherein the closure element has a second bearing hole for the pointer shaft and is inserted in the cylindrical wall such that the front wall, the cylindrical wall and the closure element confine the cavity. The bushing of the bearing assembly is preferably inserted in the casing carrier and fastened to the same.

Further advantageous configurations of the invention are defined in the subclaims and result from the following description of embodiments of the invention by way of the drawing.

BRIEF DESCRIPTION OF THE DRAWINGS

FIG. 1 shows a first embodiment of a bimetal thermometer according to the invention, wherein the bimetal thermometer is illustrated in an axial sectional view.

FIG. 2 is an axial sectional view of a bearing assembly of the bimetal thermometer according to FIG. 1.

FIG. 3 is a perspective view of the bearing assembly according to FIG. 2.

FIG. 4 shows a second embodiment of a bimetal thermometer according to the invention, wherein the bimetal thermometer is illustrated in an axial sectional view.

FIG. 5 is an axial sectional view of a bearing assembly of the bimetal thermometer according to FIG. 4 in connection with a pointer shaft.

FIG. 6 is a perspective view of the bearing assembly according to FIG. 5.

FIG. 7 is an axial sectional view of a further embodiment of a bearing assembly.

FIG. 8 is a perspective view of the bearing assembly according to FIG. 7.

FIG. 9 is an axial sectional view of a further embodiment of a bearing assembly in connection with a pointer shaft, wherein this further embodiment serves for illustration of the second aspect of the invention.

DETAILED DESCRIPTION OF THE PREFERRED EMBODIMENTS

In the following description equal reference numerals are used to identify like or corresponding elements.

FIG. 1 shows a first embodiment of the bimetal thermometer according to the invention in an axial sectional view. The shown bimetal thermometer comprises a cup-shaped casing 2 which has a substantially planar bottom wall 4. A circular cylindrical circumferential wall 6 supporting a window 8 on its free edge is integrally formed with the bottom wall 4. Inside the casing 2 a dial 10 having a scale and a pointer 12 are arranged such that the position of the pointer 12 in front of the dial 10 can be observed through the window 8.

Furthermore inside the casing 2 a mechanism 14 for adjusting the bimetal thermometer is arranged. The details of said mechanism 14 are not important to the illustration of the invention. Therefore the mechanism 14 is not described in more detail here.

The bottom wall 4 includes in its center an opening into which a casing carrier 16 is inserted. In the embodiment shown the casing carrier 16 is a substantially cylindrical element which is fixedly connected to the bottom wall 4 at its left end in FIG. 1 by welding or soldering, for instance. On the outer circumferential surface of the casing carrier 16 an external thread 18 is formed which serves for attaching the bimetal thermometer at a measuring point. In the embodiment shown the casing carrier 16 thus simultaneously constitutes the connector element of the bimetal thermometer. Such a bimetal thermometer is referred to as back-connection type bimetal thermometer.

In the casing carrier 16 an axial through-hole 19 is formed into which one end of a straight protective tube 20 is inserted. The protective tube 20 and the casing carrier 16 are fixedly and tightly connected to each other for instance by welding. At the free end of the protective tube 20, which is the right end in FIG. 1, a plug 22 is provided which is welded with the protective tube 20 and thereby closes and seals the free end thereof.

Inside the protective tube 20 a bimetal helix 24 is arranged whose first end, which is the right end in FIG. 1, is attached to the plug 22. The second end, which is the left end in FIG. 1, of the bimetal helix 24 is fixedly connected to a thin rod 26 extending in axial direction of the protective tube 20 and of the bimetal helix 24 inside the protective tube 20. The rod 26 is converted into a pointer shaft 28 so that in the embodiment shown the rod 26 and the pointer shaft 28 are formed in one piece. The pointer shaft 28 extends in the through-hole 19 of the casing carrier 16 through the latter, is rotatably journaled and supports the pointer 12 at its left end in FIG. 1.

The described bimetal thermometer is mounted at a measuring point by means of the casing carrier 16 which at the same time forms the connector element of the bimetal thermometer in the embodiment shown in such a way that at least the portion of the protective tube 20 inside which the bimetal helix 24 is provided is exposed to the measuring substance whose temperature is to be measured. In this way the bimetal helix 24 takes the temperature of the measuring substance. By virtue of the known properties of the bimetal helix 24 the second end thereof performs a rotation about the axis of the bimetal helix 24, when the temperature of the bimetal helix 24 changes so that the rotary position of the second end of the bimetal helix 24 corresponds to the temperature prevailing. The rotation of the second end of the bimetal spring 24 is transmitted to the pointer 12 by means of the rod 26 and the pointer shaft 28 formed in one piece therewith so that finally the value of the measured temperature can be read from the scale of the dial 10.

The afore-described features of the bimetal thermometer according to FIG. 1 are known from conventional bimetal thermometers. The following explanations refer to the improvement according to the invention.

The pointer shaft 28 is journaled in a bearing assembly 30 which is shown enlarged in the FIGS. 2 and 3, FIG. 2 showing the bearing assembly 30 in an axial sectional view and FIG. 3 showing the bearing assembly 30 in a perspective view.

The bearing assembly 30 comprises a bushing 32 and a closure element. The bushing 32 includes a circular cylindrical wall 36 and a front wall 38 formed integrally therewith. In the front wall 38 an axially extending first bearing hole 40 is formed for the pointer shaft 28. In the embodiment of the bearing assembly shown in FIGS. 2 and 3 the closure element is in the form of a plug 34 which is inserted in the cylindrical wall 36 at the end thereof opposed to the front wall 38. The plug 34 has an axially extending second bearing hole 42 for the pointer shaft 28 as well as a circular cylindrical outer circumferential surface which forms a force fit with the inner circumferential surface of the cylindrical wall 36. The diameter of the bearing holes 40 and 42 is substantially equal to the diameter of the pointer shaft 28. Inside the bearing assembly 30 the front wall 38, the cylindrical wall 36 and the closure element jointly confine a cavity 44 which is arranged between the bearing holes 40 and 42 and has a larger diameter than the bearing holes. In order to facilitate pressing the sealing element 34 into the bushing 32 the sealing element 34 includes a tapered chamfering at its edge facing the cavity 44. The sealing element 34 is made of Teflon, for instance, and the bushing 32 is made of brass, for instance.

A radially projecting circumferential collar 46 is formed integrally with the bushing 32. A through-hole 48 opening into the cavity 44 extends through the collar 46.

The bearing assembly 30 is inserted in the through-hole 19 of the casing carrier 16 such that there is a force fit between the outer circumferential surface of the cylindrical wall 36 and the inner circumferential surface of the through-hole. In this way, the bearing assembly 30 is attached to the casing carrier 16. In this condition the collar 36 is adjacent to the front surface, left in FIG. 1, of the casing carrier 16 so that the collar 46 ensures a correct positioning of the bearing assembly 30 relative to the casing carrier 16 when pressing the bearing assembly 30 into the casing carrier 16. On the outer circumferential surface of the front wall 38 of the bushing 32 the dial 10 and a gearwheel belonging to the mechanism 14 are fastened, as it is shown in FIG. 1. One can further infer from FIG. 1 that the pointer shaft 28 extends through the two bearing holes 40 and 42 as well as through the cavity 44 of the bearing assembly 30 and in this way is rotatably journaled by means of the bearing assembly 30.

The pointer shaft 28 extends through the two bearing holes 40 and 42 as well as through the cavity 44.

The cavity 44 of the bearing assembly 30 is filled with lubricating grease. The lubricating grease is fed to the cavity 44 during manufacture of the bimetal thermometer. This can be done, for instance, by forcing the lubricating grease through the through-hole 48 into the cavity 44 after having pressed the plug 34 into the bushing 32. The lubricating grease has a consistence referred to as plastically solid or semisolid. Usually lubricating grease substantially consists of a mixture of oil and a thickener. Lubricating grease which is marketed under the designation "Nyogel 774VH" by the manufacturer Nye Lubricants, Inc., Fairhaven, Mass., USA, has proved to be suited for the invention. This lubricating grease is a stiff, very viscous mixture of a synthetic hydrocarbon which is thickened with amorphous silicon dioxide. This lubricating grease is non-melting, has a dropping point according to ASTM D-2265 of more than 260° C. and a penetration according to ASTM D-217 of 22 mm. It is understood that also lubricating greases other than the lubricating grease Nyogel 774VH can be applied. The selection of the lubricating grease is dependent on the desired viscosity. What is essential is that the lubricating grease maintains its semisolid or plastically solid consistence within the entire temperature range to which the bearing assembly 30 is exposed in operation. Preferably, the lubricating grease is silicone free.

The continuously circular cylindrical surface of the pointer shaft 28 inside the cavity 44 is in contact with the lubricating grease. As the viscous lubricating grease adheres to the surface of the pointer shaft 28, it puts up a resistance to the vibration movements of the pointer shaft 28 and in this way damps the vibration movements. Inside the casing 2, the through-hole 19 and the protective tube 20 merely gas, for instance air, and no liquid is provided. The drawbacks of the bimetal thermometer filled with a damping liquid as described in the introductory part of the specification are thus avoided in the invention, with the desired damping effect being nevertheless achieved. The means by which the damping effect is achieved, i.e. the bearing assembly filled with lubricating grease, can be manufactured by a simple construction at low cost. It has been found that the damping effect does not get lost even after a long period of service of the bimetal thermometer.

The invention is not only applicable to the back-connection type bimetal thermometer illustrated by way of FIG. 1, but it can also be applied to a bimetal thermometer in which the casing is pivoted and rotatable relative to the protective tube. FIG. 4 shows an example of such a bimetal thermometer. Those elements of the bimetal thermometer according to FIG. 4 which correspond to the elements of the bimetal thermometer according to FIG. 1 are provided with the respective similar reference numerals and will not be described again hereinafter. The description of the bimetal thermometer according to FIG. 1 is applicable to these elements mutatis mutandis.

In the bimetal thermometer according to FIG. 1 the casing carrier 16 at the same time constitutes the connector element of the bimetal thermometer. Deviating herefrom the bimetal thermometer according to FIG. 4 includes on the one hand the casing carrier 16 and on the other hand a connector element 50 formed separately therefrom. The connector element 50 is a substantially cylindrical element having on its outer circumferential surface an external thread 52 which serves for attaching the bimetal thermometer at a measuring point. The protective tube 20 is inserted in a through-hole of the connector element 50 and is fixedly and tightly connected to the same, for instance by welding.

The casing carrier 16 and the connector element 50 are connected to each other by means of a pivoting mechanism 54. The pivoting mechanism 54 comprises a first bracket 56 to which the casing carrier 16 is fixed and a second bracket 58 which is attached to the connector element 50, as shown in FIG. 4. The two brackets 56 and 58 are hinged to each other such that the first bracket 56 and the casing 2 can be swiveled relative to the second bracket 58 in the direction of a double arrow A. Furthermore the second bracket 58 can be rotated relative to the connector element 50 about the axis of the protective tube 20. Hence the pivoting mechanism 54 permits to align the casing 2 so that the temperature can be conveniently read from the dial.

In the bimetal thermometer according to FIG. 1 the pointer shaft 28 and the rod 26 are formed integrally with each other. In contrast to that, in the bimetal thermometer according to FIG. 4 the pointer shaft 28 and the rod 26 are separate elements. The rod 26 protrudes with its upper end upwards from the connector element 50 in FIG. 4. The pointer shaft 28 projects from the casing carrier 16 with its right end in FIG. 4. The right end of the pointer shaft 28 and the upper end of the rod 26 are connected to each other by a flexible shaft 60 which is in the form of a helical spring. A flexible bellows 62 surrounds the flexible shaft 60 and is connected at its two ends on the one hand to the casing carrier 16 and on the other hand to the connector element 50 in a sealed manner.

The foregoing features of the bimetal thermometer according to FIG. 4 are known from conventional bimetal thermometers. The following explanations refer to the improvement according to the invention.

The bimetal thermometer according to FIG. 4 comprises the bearing assembly 30 shown enlarged in the FIGS. 5 and 6 for supporting the pointer shaft 28. This bearing assembly 30 substantially corresponds to the above-described bearing assembly 30 according to FIG. 2 as regards its constructional design and its function.

Accordingly, the bearing assembly illustrated in FIGS. 5 and 6 comprises the bushing 32 including the cylindrical wall 36, the front wall 38, the collar 46 and the through-hole 48. In contrast to the bearing assembly according to FIG. 2, the bearing assembly according to FIG. 5 has an external thread 64 on the outer circumferential surface of the cylindrical wall 36 and a hexagon surface is formed at the collar 46 (cf. FIG. 6). The bearing assembly 30 is thus screwed into the casing carrier 16 in the second embodiment of the bimetal thermometer. Such a screwed connection may also be provided in the first embodiment instead of the force fit. On the other hand, also in the second embodiment a force fit may be provided instead of the screwed connection.

As shown in FIG. 5, the plug 34 is hollow so that the cavity 44 extends into the plug. FIG. 5 further shows the pointer shaft 28 supported in the bearing assembly 30 and the right end 66 thereof. The end 66 is shaped so that the flexible shaft 60 can be reliably fastened to this end.

The cavity 44 of the bearing assembly 30 according to FIG. 5 is filled with lubricating grease. As regards the lubricating grease and its damping effect, the foregoing explanations are applicable in connection with the first embodiment. Also in the second embodiment of the bimetal thermometer neither the casing 2 nor the protective tube 20 is filled with a liquid.

The FIGS. 7 and 8 show a further embodiment of the bearing assembly 30. In this bearing assembly 30 the closure element is formed by a washer 66 which is located in the cylindrical wall 36 by force fit and rests on a shoulder of the bushing 32, as this is illustrated in FIG. 7. The bearing assembly according to the FIGS. 7 and 8 can be applied both to the bimetal thermometer according to FIG. 1 and to the bimetal thermometer according to FIG. 4.

FIG. 9 shows, in a representation similar to FIG. 5, a bearing assembly 30 and a pointer shaft 28 which serve for illustrating the second aspect of the invention. The bearing assembly 30 and the pointer shaft 28 according to FIG. 9 can be used instead of the bearing assembly and the pointer shaft according to FIG. 5 in the bimetal thermometer according to FIG. 4.

The bushing 32 of the bearing assembly 30 in accordance with FIG. 9 differs from the bushing 32 of the bearing assembly 30 according to FIG. 5 only by the fact that the cylindrical wall 36 in FIG. 9 has a larger inner diameter. On the pointer shaft 28 inside the cavity 44 a sleeve 68 is mounted which is integrally formed with four wings 70 extending in axial direction and arranged equidistantly in circumferential direction, each of which forms a radial projection of the pointer shaft 28. The cavity 44 is filled with lubricating grease similarly as in the previous embodiments. The bearing assembly according to FIG. 9 has no openings apart from the two bearing holes 40 and 42 for the pointer shaft 28 so that the lubricating grease is contained in the cavity 44. As regards the lubricating grease, the explanations in connection with the first embodiments apply. What is essential is that the lubricating grease maintains its semisolid or plastically solid consistence in use of the bimetal thermometer. The lubricating grease shall not be liquid and shall not creep, however it is required to be plastically fluid to such an extent that it flows form the front side of the wings 70 to the near side thereof, when the wings are rotated in the cavity 44. Thus, the lubricating grease has a gel like consistence and constitutes in the present invention a damping gel. The preferred lubricating grease of the bimetal thermometer according to the second aspect of the invention has a lower viscosity than that of the lubricating grease of the bimetal thermometer according to the first aspect of the invention.

When the pointer shaft 28 performs a vibration movement, it is damped by the interaction of the pointer shaft 28 and the wings 70 with the damping gel formed by the lubricating grease. The extent of the damping effect can be adjusted by appropriately selecting the viscosity of the lubricating grease, on the one hand, as well as the number and the dimensions of the wings 70, on the other hand.

The bimetal thermometer according to the second aspect of the invention substantially has the same advantages as the bimetal thermometer according to the first aspect of the invention, i.e. as the bimetal thermometer in which the pointer shaft has a smooth, continuously circular cylindrical surface and no wings. In the bimetal thermometer according to the second aspect of the invention likewise the desired damping of vibration movements is achieved without the necessity for this purpose to fill the bimetal thermometer outside the bearing assembly with a damping liquid.

In the foregoing preferred embodiments of the invention are illustrated. However, the invention is not restricted to the details of the described embodiments.

The bimetal thermometer according to the invention comprises a bimetal helix arranged inside a protective tube, the one end of which is attached to the protective tube and the other end of which is connected to a pointer shaft to which a pointer arranged inside a casing is fastened. The pointer shaft is rotatably journaled in a bearing assembly in which a cavity is formed through which the pointer shaft extends. The cavity is filled with semisolid lubricating grease for damping vibration movements of the pointer shaft. The pointer shaft has either a smooth surface or is provided with at least one radial projection arranged inside the cavity. Vibration movements of the pointer shaft are damped by the interaction of the pointer shaft and, if provided, the projections with the viscous lubricating grease. This design of the bearing assembly and the pointer shaft enables a damped bimetal thermometer to be provided without a liquid filling being required in the casing and the protective tube or at least in the protective tube for the purpose of damping.

The invention claimed is:

1. A bimetal thermometer comprising
a cup-shaped gas filled casing which has a bottom wall and supports a window at its edge opposed to the bottom wall,
a casing carrier to which the bottom wall is attached,
a protective gas filled tube having a free closed end and being connected to the casing carrier at its other end, and
a bimetal helix arranged inside the protective tube and attached with its first end to the free end of the protective tube,
wherein a dial and a pointer which is fastened to a pointer shaft are arranged inside the casing, and
a bearing assembly wherein the pointer shaft is rotatably journaled, said pointer shaft extending through the bearing assembly and casing carrier and being connected to a second end of the bimetal helix such that a temperature-dependent rotation of the second end of the bimetal helix causes a rotation of the pointer shaft,
wherein the improvement comprises that the bearing assembly has a cavity through which the pointer shaft extends, said bearing assembly including a bushing and a closure element defining said cavity and
that the cavity is filled with lubricating grease.

2. A bimetal thermometer according to claim 1, wherein the lubricating grease consists of a mixture of mineral oil and a thickener.

3. A bimetal thermometer according to claim 1, wherein the lubricating grease consists of a mixture of synthetic hydrocarbon and amorphous silicon dioxide.

4. A bimetal thermometer according to any one of the claims 1 to 3, wherein the lubricating grease is plastically solid in the entire indicating range of the bimetal thermometer.

5. A bimetal thermometer according to any one of the claims 1 to 3, wherein the dropping point of the lubricating grease is above 260° C.

6. A bimetal thermometer according to claim 1, wherein the bushing has a cylindrical wall and at the one end thereof a front wall in which a first bearing hole is formed for the pointer shaft, and wherein the closure element has a second bearing hole for the pointer shaft and is inserted in the cylindrical wall such that the front wall, the cylindrical wall and the closure element confine the cavity.

7. A bimetal thermometer according to claim 6, wherein the closure element is formed as a cylindrical plug.

8. A bimetal thermometer according to claim 6, wherein the closure element is formed as a washer.

9. A bimetal thermometer according to claim 6, wherein a radially extending through-hole opening into the cavity is formed in the bushing.

10. A bimetal thermometer according to any one of the claims 6 to 9, wherein the bushing of the bearing assembly is inserted in the casing carrier and is attached to the same.

11. A bimetal thermometer according to claim 10, wherein the bushing has a radially projecting collar which is adjacent to a front surface of the casing carrier.

12. A bimetal thermometer comprising
a cup-shaped casing which has a bottom wall and supports a window at its edge opposed to the bottom wall,
a casing carrier to which the bottom wall is attached,
a protective tube having a free closed end and being connected to the casing carrier at its other end, and
a bimetal helix which is arranged inside the protective tube and is attached with its first end to the free end of the protective tube,
wherein a dial and a pointer which is fastened to a pointer shaft are arranged inside the casing, and
wherein the pointer shaft is rotatably journaled by means of a bearing assembly, extends through the casing carrier and is connected to the second end of the bimetal helix such that a temperature-dependent rotation of the second end of the bimetal helix causes a rotation of the pointer shaft,
wherein the improvement comprises that the bearing assembly includes a cavity through which the pointer shaft extends,
that the cavity is filled with a lubricating grease and
that at least one radial projection is arranged on the pointer shaft in the region of the cavity.

13. A bimetal thermometer according to claim 12, wherein in the region of the cavity a sleeve which is integrally formed with at least one radially projecting wing forming the radial projection is attached to the pointer shaft.

14. A bimetal thermometer according to claim 12, wherein the bearing assembly includes a bushing and a closure element, wherein the bushing has a cylindrical wall and at the other end thereof a front wall in which a first bearing hole is formed for the pointer shaft, and wherein the closure element has a second bearing hole for the pointer shaft and is inserted in the cylindrical wall such that the front wall, the cylindrical wall and the closure element confine the cavity.

15. A bimetal thermometer according to claim 12, wherein the closure element is formed as a cylindrical plug.

16. A bimetal thermometer according to claim 12, wherein the closure element is formed as a washer.

17. A bimetal thermometer according to any one of the claims 14 to 16, wherein the bushing of the bearing assembly is inserted in the casing carrier and is attached to the same.

18. A bimetal thermometer according to claim 17, wherein the bushing has a radially projecting collar which is adjacent to a front surface of the casing carrier.

* * * * *